US012570775B2

(12) United States Patent
Thuilliez et al.

(10) Patent No.: US 12,570,775 B2
(45) Date of Patent: Mar. 10, 2026

(54) CATALYTIC SYSTEM BASED ON A METALLOCENE AND A DIORGANOMAGNESIUM

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Robert Ngo, Clermont-Ferrand (FR); François Jean-Baptiste-Dit-Dominique, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 881 days.

(21) Appl. No.: 17/781,415

(22) PCT Filed: Dec. 14, 2020

(86) PCT No.: PCT/FR2020/052426
§ 371 (c)(1),
(2) Date: Aug. 26, 2022

(87) PCT Pub. No.: WO2021/123589
PCT Pub. Date: Jun. 24, 2021

(65) Prior Publication Data

US 2023/0357462 A1 Nov. 9, 2023

(30) Foreign Application Priority Data

Dec. 17, 2019 (FR) ....................................... 1914624

(51) Int. Cl.
*C08F 210/02* (2006.01)
*C07F 17/00* (2006.01)

(52) U.S. Cl.
CPC ............ *C08F 210/02* (2013.01); *C07F 17/00* (2013.01)

(58) Field of Classification Search
CPC ............................... C08F 210/02; C07F 17/00
USPC .......................................... 502/117, 150, 152
See application file for complete search history.

(56) References Cited

U.S. PATENT DOCUMENTS 3,597,487 A * 8/1971 Shephert, Jr. ............. C07F 3/02
260/665 R
5,688,887 A * 11/1997 Bagheri ............... C10M 133/54
585/512
6,372,681 B1 * 4/2002 Yamada .................. C08F 10/00
502/103
8,071,700 B2 * 12/2011 Thuilliez ................. C07F 17/00
502/103
8,071,800 B2 * 12/2011 Thuilliez ................. C08F 10/00
502/103
10,752,712 B2 * 8/2020 Lafaquiere ............ C08F 210/02
10,934,377 B2 * 3/2021 Lafaquiere ............ C08F 236/06
2012/0184431 A1 * 7/2012 Kawashima ......... B01J 31/2295
502/103
2014/0378630 A1 12/2014 McCauley et al.
2018/0362679 A1 12/2018 Kim et al.
2019/0233566 A1 * 8/2019 Lafaquiere ............ C08F 236/08
2019/0248822 A1 * 8/2019 Jean-Baptiste-Dit-Dominique .....
B01J 31/122
2019/0263954 A1 * 8/2019 Lafaquiere ............ C08F 236/06
2023/0047483 A1 * 2/2023 Thuilliez ................... C07F 3/02

FOREIGN PATENT DOCUMENTS

| | | | | | |
|---|---|---|---|---|---|
| EP | 0839836 | A1 * | 5/1998 | ................ C08F 4/60 |
| EP | 1092731 | A1 | 4/2001 | |
| EP | 2797969 | A1 | 11/2014 | |
| EP | 3387067 | A1 | 10/2018 | |
| FR | 3118042 | A1 * | 6/2022 | ............ C08F 110/02 |
| WO | 2004035639 | A1 | 4/2004 | |
| WO | 2007054224 | A2 | 5/2007 | |
| WO | 2018224776 | A1 | 12/2018 | |

OTHER PUBLICATIONS

English translation of Written Opinion for PCT/FR2020/092426. (Year: 2021).*
International Search Report and Written Opinion with English translation mailed Apr. 20, 2021 for International Application No. PCT/FR2020/052426, 10 pages.

* cited by examiner

*Primary Examiner* — Patricia L. Hailey
(74) *Attorney, Agent, or Firm* — Dickinson Wright PLLC

(57) ABSTRACT

A catalytic system based on at least one metallocene and on a diorganomagnesium compound of formula $R^B$—Mg—$R^A$ is provided, $R^B$ being different from $R^A$ and comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being an alkyl, a cycloalkyl or a benzyl, which may be substituted or unsubstituted. The catalytic system makes it possible to increase the functional group content in the synthesis of a functional polymer.

22 Claims, No Drawings

CATALYTIC SYSTEM BASED ON A METALLOCENE AND A DIORGANOMAGNESIUM

CROSS-REFERENCE TO RELATED APPLICATIONS

This U.S. national phase patent application claims priority to and the benefit of International Patent Application No. PCT/FR2020/052426, filed on Dec. 14, 2020, which claims priority to and the benefit of French patent application no. FR1914624, filed Dec. 17, 2019, the contents of which are incorporated herein by reference in their entirety.

BACKGROUND

1. Technical Field

The field of the present invention is that of catalytic systems which are based on a rare-earth metal metallocene and on an organomagnesium compound and which are intended to be used in the preparation of polyolefins, in particular of copolymers of olefin and of 1,3-diene.

2. Related Art

Catalytic systems based on rare-earth metal metallocenes are described, for example, in patent applications EP 1 092 731, WO 2004/035639, WO 2007/054224 and WO 2018/224776. They allow the synthesis of polyolefins, in particular of copolymers of olefin and of 1,3-diene. They are also used in the preparation of functional copolymers of ethylene and of 1,3-butadiene, as described in WO 2018/224776. In these catalytic systems, the metallocene is activated with a co-catalyst which forms part of the catalytic system. Co-catalysts that may be suitable for use include an organomagnesium agent, an organoaluminium agent or an organolithium agent. When the co-catalyst is an organomagnesium agent, it is typically a diorganomagnesium compound in which the magnesium atom is bonded to two aliphatic groups.

SUMMARY

The Applicant has discovered a novel catalytic system based on a rare-earth metal metallocene using as co-catalyst a diorganomagnesium compound which contains a magnesium-carbon bond, said carbon being a constituent carbon atom of a specific benzene nucleus. The novel catalytic system makes it possible to increase the functional group content in the synthesis of a functional polymer. Even according to certain embodiments of the invention, the catalytic activity of the catalytic system is improved.

Thus, a first subject of the invention is a catalytic system based at least:

on a metallocene of formula (Ia) or (Ib), preferably (Ia), on a diorganomagnesium compound as co-catalyst, $$\{P(Cp^1)(Cp^2)Y\} \quad (Ia)$$

$$Cp^3Cp^4Y \quad (Ib)$$

Y denoting a group including a metal atom which is a rare-earth metal, $Cp^1$, $Cp^2$, $Cp^3$ and $Cp^4$, which may be identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the diorganomagnesium compound being an asymmetric compound of formula (II)

$$R^B\text{—Mg—}R^A \quad (II)$$

$R^B$ being different from $R^A$, $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being an alkyl, a cycloalkyl or a benzyl, which may be substituted or unsubstituted.

The invention also relates to a process for preparing a polymer, which comprises a step of polymerization of a monomer M chosen from the group of monomers consisting of conjugated dienes, ethylene, α-monoolefins and mixtures thereof in the presence of a catalytic system in accordance with the invention.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b).

The abbreviation "phr" means parts by weight per hundred parts of elastomer (of the total of the elastomers if several elastomers are present).

The compounds mentioned in the description may be of fossil origin or may be biobased. In the latter case, they may be partially or totally derived from biomass or may be obtained from renewable starting materials derived from biomass.

The term "based on" used to define the constituents of the catalytic system means the mixture of these constituents, or the product of the reaction of a portion or all of these constituents with each other.

In the present patent application, the term "metallocene" means an organometallic complex, the metal of which, in the case in point the rare-earth metal atom, is bonded to two groups $Cp^3$ and $Cp^4$ or to a ligand molecule consisting of two groups $Cp^1$ and $Cp^2$ connected together by a bridge P. These groups $Cp^1$, $Cp^2$, $Cp^3$ and $Cp^4$, which may be identical or different, are chosen from the group consisting of fluorenyl groups, cyclopentadienyl groups and indenyl groups, these groups possibly being substituted or unsubstituted. It is recalled that rare-earth elements are metals and denote the elements scandium, yttrium and the lanthanides, the atomic number of which ranges from 57 to 71.

According to a first variant of the invention, the metallocene used as base constituent in the catalytic system in accordance with the invention corresponds to formula (Ia)

$$\{P(CP^1)(Cp^2)Y\} \quad (Ia)$$

in which

Y denotes a group including a metal atom which is a rare-earth metal, $Cp^1$ and $Cp^2$, which may be identical or different, are chosen from the group consisting of fluorenyl groups, cyclopentadienyl groups and indenyl groups, the groups being substituted or unsubstituted, P is a group bridging the two groups $Cp^1$ and $Cp^2$ and comprising a silicon or carbon atom.

According to a second variant of the invention, the metallocene used as base constituent in the catalytic system in accordance with the invention corresponds to formula (Ib)

$$Cp^3Cp^4Y \quad \text{(Ib)}$$

in which

Y denotes a group including a metal atom which is a rare-earth metal, $Cp^3$ and $Cp^4$, which may be identical or different, are chosen from the group consisting of fluorenyl groups, cyclopentadienyl groups and indenyl groups, the groups being substituted or unsubstituted.

As substituted cyclopentadienyl, fluorenyl and indenyl groups, mention may be made of those substituted with alkyl radicals containing from 1 to 6 carbon atoms or with aryl radicals containing from 6 to 12 carbon atoms or else with trialkylsilyl radicals, such as $SiMe_3$. The choice of the radicals is also guided by the accessibility to the corresponding molecules, which are the substituted cyclopentadienes, fluorenes and indenes, since said molecules are commercially available or can be readily synthesized.

As substituted fluorenyl groups, mention may be made particularly of 2,7-di(tert-butyl)fluorenyl and 3,6-di(tert-butyl)fluorenyl. The 2, 3, 6 and 7 positions respectively denote the position of the carbon atoms of the rings as represented in the diagram below, the 9 position corresponding to the carbon atom to which the bridge P is attached.

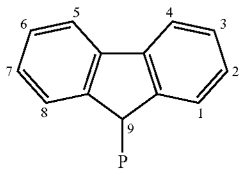

As substituted cyclopentadienyl groups, mention may be made particularly of those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

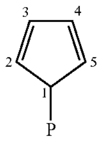

As substituted indenyl groups, mention may be made particularly of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

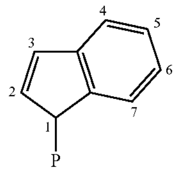

Preferably, the metallocene is of formula (Ia).

According to a preferential embodiment of the invention, $Cp^1$ and $Cp^2$ are identical and are chosen from the group consisting of substituted fluorenyl groups and the unsubstituted fluorenyl group of formula $C_{13}H_8$. The catalytic system according to this preferential embodiment has the distinguishing feature of resulting in copolymers of butadiene and ethylene which comprise, in addition to the ethylene monomer units and the butadiene units, cyclic 1,2-cyclohexane units having the following formula:

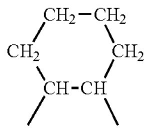

Advantageously, $Cp^1$ and $Cp^2$ are identical and each represent an unsubstituted fluorenyl group of formula $C_{13}H_8$, represented by the symbol Flu.

According to a preferential embodiment of the invention, the symbol Y represents the group Met-G, with Met denoting a metal atom which is a rare-earth metal with G denoting a group comprising the borohydride $BH_4$ unit or denoting a halogen atom chosen from the group consisting of chlorine, fluorine, bromine and iodine. Advantageously, G denotes a chlorine atom or the group of formula (III):

$$(BH_4)_{(1+y)}\text{-}L_y\text{-}N_x \quad \text{(III)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

Very advantageously, G denotes the group of formula (III).

Any ether which has the ability to complex the alkali metal, notably diethyl ether and tetrahydrofuran, is suitable as ether.

According to any one of the embodiments of the invention, the metal of the metallocene that is useful for the purposes of invention, in the case in point the rare-earth metal, is preferably a lanthanide, the atomic number of which ranges from 57 to 71, more preferentially neodymium, Nd.

The bridge P connecting the groups $Cp^1$ and $Cp^2$ preferably corresponds to the formula $ZR^1R^2$, in which Z represents a silicon or carbon atom and $R^1$ and $R^2$, which may be identical or different, each represent an alkyl group comprising from 1 to 20 carbon atoms, preferably a methyl. In the formula $ZR^1R^2$, Z advantageously represents a silicon atom, Si.

The metallocene that is useful for the synthesis of the catalytic system may be in the form of a crystalline or non-crystalline powder, or else in the form of single crystals.

The metallocene may be in a monomer or dimer form, these forms depending on the method of preparation of the metallocene, as is described, for example, in patent application WO 2007/054224 or WO 2007/054223. The metallocene may be prepared conventionally by a process analogous to that described in patent application WO 2007/054224 or WO 2007/054223, notably by reaction, under inert and anhydrous conditions, of the salt of an alkali metal of the ligand with a rare-earth metal borohydride in a suitable solvent, such as an ether, for instance diethyl ether or tetrahydrofuran, or any other solvent known to those skilled in the art. After reaction, the metallocene is separated from the reaction by-products via techniques known to those skilled in the art, such as filtration or precipitation from a second solvent. The metallocene is finally dried and isolated in solid form.

According to a particularly preferential embodiment, the metallocene is of formula (III-1), (III-2), (III-3), (III-4) or (III-5):

$[Me_2Si(Flu)_2Nd(\mu\text{-}BH_4)_2Li(THF)]$ (III-1)

$[\{Me_2SiFlu_2Nd(\mu\text{-}BH_4)_2)Li(THF)\}_2]$ (III-2)

$[Me_2SiFlu_2Nd(\mu\text{-}BH_4)(THF)]$ (III-3)

$[\{Me_2SiFlu_2Nd(\mu\text{-}BH_4)(THF)\}_2]$ (III-4)

$[Me_2SiFlu_2Nd(\mu\text{-}BH_4)]$ (III-5)

In which Flu represents the $C_{13}H_8$ group.

Another base constituent of the catalytic system in accordance with the invention is the co-catalyst that is capable of activating the metallocene with regard to polymerization, notably in the polymerization initiation reaction. The co-catalyst that is useful for the purposes of the invention is a diorganomagnesium compound of formula (II), which is said to be "asymmetric" and is referred to in the present invention as an asymmetric diorganomagnesium compound, since the two groups represented by the symbols $R^B$ and $R^A$ are different from each other.

$R^B$—Mg—$R^A$ (II)

The group represented by the symbol $R^A$ is an alkyl, a cycloalkyl or a benzyl, which may be substituted or unsubstituted. The alkyl represented by the symbol $R^A$ may be linear or branched, preferably linear, and may contain 1 to 12 carbon atoms, preferably 2 to 10 carbon atoms, more preferentially from 2 to 8 carbon atoms. The cycloalkyl represented by the symbol $R^A$ may contain 4 to 12 carbon atoms. Preferably, $R^A$ represents a linear alkyl containing from 2 to 8 carbon atoms. Better still, $R^A$ represents n-butyl.

The group represented by the symbol $R^B$ has the essential characteristic of comprising a benzene nucleus substituted with a magnesium atom. The two carbon atoms of the benzene nucleus of $R^B$ ortho to the magnesium bear an identical or different substituent. Alternatively, one of the two carbon atoms of the benzene nucleus of $R^B$ ortho to the magnesium may bear a substituent, and the other carbon atom of the benzene nucleus of $R^B$ ortho to the magnesium may form a ring. The substituent is a methyl, an ethyl or an isopropyl. In the case where one of the two carbon atoms of the benzene nucleus of $R^B$ ortho to the magnesium is substituted with an isopropyl, the second carbon atom of the benzene nucleus of $R^B$ ortho to the magnesium is preferably not substituted with an isopropyl. Preferably, the carbon atoms of the benzene nucleus of $R^B$ ortho to the magnesium are substituted with a methyl or an ethyl. More preferentially, the carbon atoms of the benzene nucleus of $R^B$ ortho to the magnesium are substituted with a methyl.

According to a preferential embodiment, the asymmetric diorganomagnesium compound corresponds to formula (IV) in which $R^A$ is an alkyl, a cycloalkyl or a benzyl, which may be substituted or unsubstituted, $R_1$ and $R_5$, which may be identical or different, represent a methyl or an ethyl and $R_2$, $R_3$ and $R_4$, which may be identical or different, represent a hydrogen atom or an alkyl. Preferably, $R_1$ and $R_5$ represent a methyl. Preferably, $R_2$ and $R_4$ represent a hydrogen atom.

(IV)

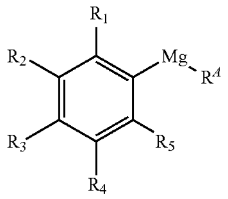

According to a preferential variant, $R_1$, $R_3$ and $R_5$ are identical. According to a more preferential variant, $R_2$ and $R_4$ represent a hydrogen and $R_1$, $R_3$ and $R_5$ are identical. In a more preferential variant, $R_2$ and $R_4$ represent a hydrogen and $R_1$, $R_3$ and $R_5$ represent a methyl.

The asymmetric diorganomagnesium compound that is useful for the invention may be prepared via a process which comprises the following steps:

- the placing in contact of an organometallic compound of formula RAM with an organomagnesium agent of formula $R^B$—Mg—X,
- the reaction of the organometallic compound of formula $R^AM$ and of the organomagnesium agent of formula $R^B$—Mg—X,
- M representing a lithium, sodium or potassium atom, X representing a leaving group, $R^B$ and $R^A$ being as defined previously.

The term "leaving group" means a leaving group as defined by the IUPAC. Leaving groups that may be mentioned most particularly include halogen atoms chosen from the group consisting of chlorine, fluorine, bromine and iodine. X is preferentially a halogen atom. X is more preferentially a bromine atom or a chlorine atom. X is even more preferentially a bromine atom.

Preferably, M represents a lithium atom, in which case the organometallic compound of formula $R^AM$ is an organolithium agent.

The reaction of the organolithium agent and of the organomagnesium agent is typically performed in an ether such as diethyl ether, dibutyl ether, tetrahydrofuran or methyltetrahydrofuran. The reaction is also typically performed at a temperature ranging from 0° C. to 60° C. The placing in contact is preferably performed at a temperature of between 0° C. and 23° C.

The placing in contact of the organometallic compound of formula $R^AM$ with the organomagnesium agent of formula $R^B$—Mg—X is preferentially performed by adding a solution of the organometallic compound RAM to a solution of the organomagnesium agent $R^B$—Mg—X. The solution of the organometallic compound $R^AM$ is generally a solution in a hydrocarbon solvent, preferably n-hexane, cyclohexane or methylcyclohexane, and the solution of the organomagnesium agent $R^B$—Mg—X is generally a solution in an ether, preferably diethyl ether, tetrahydrofuran or methyltetrahydrofuran. Preferably, the respective concentrations of the solutions of the organometallic compound and of the organomagnesium agent $R^AM$ and $R^B$—Mg—X are 0.01 to 1 mol/l and from 1 to 5 mol/l. More preferentially, the respective concentrations of the solutions of the organometallic compound and of the organomagnesium agent $R^AM$ and $R^B$—Mg—X are from 0.05 to 0.2 mol/l and from 2 to 3 mol/l.

Like any synthesis performed in the presence of organometallic compounds, the placing in contact and the reaction take place under anhydrous conditions under an inert atmosphere. Typically, the solvents and the solutions are used under anhydrous nitrogen or argon. The various steps of the process are generally performed with stirring.

Once the asymmetric diorganomagnesium compound has been formed, it is generally recovered in solution after filtration performed under an inert anhydrous atmosphere. The solution of asymmetric diorganomagnesium compound is typically stored before use in hermetic vessels, for example capped bottles, at a temperature of between −25° C. and 23° C.

Like any organomagnesium compound, the diorganomagnesium compound $R^B$—Mg—$R^A$ that is useful for the purposes of the invention may be in the form of a monomer species $(R^B—Mg—R^A)_1$ or in the form of a polymer species $(R^B—Mg—R^A)_p$, p being an integer greater than 1, notably a dimer $(R^B—Mg—R^A)_2$. Moreover, whether it is in the form of a monomer or polymer species, it may also be in the form of a species coordinated to one or more molecules of a solvent, preferably of an ether such as diethyl ether, tetrahydrofuran or methyltetrahydrofuran.

The catalytic system in accordance with the invention may be prepared conventionally via a process analogous to that described in patent application WO 2007/054224 or WO 2007/054223. For example, the asymmetric diorganomagnesium compound and the metallocene are reacted in a hydrocarbon solvent typically at a temperature ranging from 20° C. to 80° C. for a time of between 5 and 60 minutes. The amounts of co-catalyst and of metallocene reacted are such that the ratio between the number of moles of Mg of the co-catalyst and the number of moles of rare-earth metal of the metallocene is preferably from 1 to 100 and more preferentially from 1 to less than 10. The range of values extending from 1 to less than 10 is notably more favourable for obtaining polymers of high molar masses. The catalytic system is generally prepared in an aliphatic hydrocarbon solvent such as methylcyclohexane, or an aromatic hydrocarbon solvent such as toluene. Generally, after its synthesis, the catalytic system is used in this form in the process for the synthesis of the polymer in accordance with the invention.

Alternatively, the catalytic system in accordance with the invention may be prepared via a process analogous to that described in patent application WO 2017/093654 A1 or in patent application WO 2018/020122 A1. According to this alternative, the catalytic system also contains a preformation monomer chosen from a conjugated diene, ethylene or a mixture of ethylene and a conjugated diene, in which case the catalytic system is based at least on the metallocene, the asymmetric diorganomagnesium compound and the preformation monomer. For example, the asymmetric diorganomagnesium compound and the metallocene are reacted in a hydrocarbon solvent typically at a temperature of from 20° C. to 80° C. for 10 to 20 minutes to obtain a first reaction product, and the preformation monomer, chosen from a conjugated diene, ethylene or a mixture of ethylene and a conjugated diene, is then reacted with this first reaction product at a temperature ranging from 40° C. to 90° C. for 1 hour to 12 hours. The conjugated diene, as preformation monomer, is preferably a 1,3-diene such as 1,3-butadiene, isoprene or a 1,3-diene of formula $CH_2{=}R{-}CH{=}CH_2$, the symbol R representing a hydrocarbon chain containing 3 to 20 carbon atoms, in particular myrcene or βfarnesene. The catalytic system thus obtained may be used directly in the process in accordance with the invention or may be stored under an inert atmosphere, notably at a temperature ranging from −20° C. to room temperature (23° C.), before being used in the synthesis of polymers.

Like any synthesis performed in the presence of an organometallic compound, the synthesis of the metallocene, the synthesis of the asymmetric diorganomagnesium compound and the synthesis of the catalytic system take place under anhydrous conditions under an inert atmosphere. Typically, the reactions are performed starting with anhydrous solvents and compounds under anhydrous nitrogen or argon.

The catalytic system may be in the form of a solution when it is in the presence of a hydrocarbon solvent. The hydrocarbon solvent may be aliphatic, such as methylcyclohexane, or aromatic, such as toluene. The hydrocarbon solvent is preferably aliphatic, more preferentially methylcyclohexane. Generally, the catalytic system is stored in the form of a solution in the hydrocarbon solvent before being used in polymerization. This may then be referred to as a catalytic solution which comprises the catalytic system and the hydrocarbon solvent. According to any of the embodiments of the invention, the catalytic system preferably comprises a hydrocarbon solvent. When the catalytic system is in solution, its concentration is defined by the content of metallocene metal in the solution. The concentration of metallocene metal has a value preferentially ranging from 0.0001 to 0.2 mol/l, more preferentially from 0.001 to 0.03 mol/l.

The catalytic system according to the invention is intended to be used in a process for the synthesis of polymers, notably elastomers, which may be used in rubber compositions, for example for tires. When the process comprises a step of functionalizing the polymers, the combined use of the metallocene and of the asymmetric diorganomagnesium compound as described according to the embodiments of the invention makes it possible to increase the content of functional polymer chains. Even the catalytic activity in the synthesis of polymers may also be improved, notably when the substituents on the benzene nucleus ortho to the magnesium in the asymmetric diorganomagnesium compound are both other than an isopropyl group.

The polymers are typically copolymers of dienes and of olefins. Olefins that may particularly be mentioned include ethylene and α-olefins, notably those containing 3 to 18 carbon atoms. Dienes that are most particularly suitable for use are 1,3-dienes, more particularly 1,3-dienes containing from 4 to 24 carbon atoms, such as 1,3-butadiene, isoprene, myrcene and β-farnesene, and mixtures thereof.

The process for preparing a polymer, which is another subject of the invention, comprises a step of polymerization of a monomer M chosen from the group of monomers consisting of conjugated dienes, ethylene, α-monoolefins and mixtures thereof in the presence of a catalytic system in accordance with the invention. Preferably, the monomer M is a mixture of a 1,3-diene and of ethylene. Dienes that are most particularly suitable for use are 1,3-dienes, more particularly 1,3-dienes containing from 4 to 24 carbon atoms, such as 1,3-butadiene, isoprene, myrcene and β-farnesene, and mixtures thereof. According to the microstructure and the length of the polymer chains prepared via the process in accordance with the invention, the polymer may be an elastomer.

The polymerization is preferably performed in solution, continuously or batchwise. The polymerization solvent may be an aromatic or aliphatic hydrocarbon solvent. Examples of polymerization solvents that may be mentioned include toluene and methylcyclohexane. The monomer M may be introduced into the reactor containing the polymerization solvent and the catalytic system or, conversely, the catalytic system may be introduced into the reactor containing the polymerization solvent and the monomer M. The monomer M and the catalytic system may be introduced simultaneously into the reactor containing the polymerization solvent, notably in the case of a continuous polymerization. The polymerization is typically performed under anhydrous conditions and in the absence of oxygen, in the optional presence of an inert gas. The polymerization temperature generally varies within a range extending from 40 to 150° C., preferentially from 40 to 120° C. It is adjusted according to the monomer to be polymerized. Preferably, the copolymerization is performed at a constant pressure of ethylene.

During the polymerization of ethylene and of 1,3-dienes in a polymerization reactor, ethylene and 1,3-dienes may be added continuously to the polymerization reactor, in which case the polymerization reactor is a fed reactor. This embodiment is most particularly suitable for the synthesis of a statistical copolymer.

The polymerization can be stopped by cooling the polymerization medium or by adding an alcohol. The polymer can be recovered according to conventional techniques known to those skilled in the art, for instance by precipitation, by evaporation of the solvent under reduced pressure or by steam stripping.

Alternatively, instead of adding an alcohol, a functionalizing agent may be added, in which case the process comprises, after the polymerization step, the addition of a functionalizing agent to functionalize the polymer. A polymer bearing a function such as an amine function, a silanol function or an alkoxysilane function is then recovered. According to a particular embodiment of the invention, the polymer bears an amine, alkoxysilane or silanol function.

According to a first variant in which the function borne by the polymer is an amine function, the functionalizing agent is preferably a compound of formula (V), $$Si(Fc^1)_{3-g}(Rc^2)_g(Rca) \quad (V)$$

the symbols $Fc^1$, which may be identical or different, representing an alkoxy group, the symbols $Rc^2$, which may be identical or different, representing a hydrogen atom or a hydrocarbon chain, the symbol Rca representing a hydrocarbon chain substituted with an amine function, g being an integer ranging from 0 to 1.

The alkoxy group represented by the symbol $Fc^1$ in formula (V) is preferably methoxy or ethoxy.

The amine function designated in the symbol Rca in formula (V), namely the amine function of the functionalizing agent, is a protected primary amine function, a protected secondary amine function or a tertiary amine function. Protecting groups for the primary amine and secondary amine functions that may be mentioned include silyl groups, for example trimethylsilyl and tert-butyldimethylsilyl groups. Preferably, the amine function of the functionalizing agent is a tertiary amine function. Advantageously, the amine function of the functionalizing agent is a tertiary amine of formula $—N(R_B)_2$ in which each $R_B$ represents an alkyl, preferentially a methyl or an ethyl.

As functionalizing agent for preparing a polymer bearing an amine function according to the first variant, mention may be made of the compounds (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, (N,N-dimethylaminopropyl)trimethoxysilane, (N,N-dimethylaminopropyl)triethoxysilane, (N-(3-trimethoxysilyl)propyl)-N-(trimethylsilyl)silanamine and (N-(3-triethoxysilyl)propyl)-N-(trimethylsilyl)silanamine, preferably (N,N-dimethyl-3-aminopropyl)methyldimethoxysilane, (N,N-dimethyl-3-aminopropyl)ethyldimethoxysilane, (N,N-dimethylaminopropyl)trimethoxysilane and (N-(3-trimethoxysilyl)propyl)-N-(trimethylsilyl)silanamine, more preferentially (N,N-dimethylaminopropyl)trimethoxysilane and (N-(3-trimethoxysilyl)propyl)-N-(trimethylsilyl)silanamine.

According to a second variant in which the function borne by the polymer is a silanol or alkoxysilane function, the functionalizing agent is preferably a compound of formula (VI), $$Si(Fc^1)_{4-g}(Rc^2)_g \quad (VI)$$

the symbols $Fc^1$, which may be identical or different, representing an alkoxy group or a halogen atom, the symbols $Rc^2$, which may be identical or different, representing a hydrogen atom, a hydrocarbon chain or a hydrocarbon chain substituted with a chemical function $Fc^2$, g being an integer ranging from 0 to 2.

When the symbol $Fc^1$ represents an alkoxy group in formula (VI), the alkoxy group is preferably methoxy or ethoxy. When the symbol Fe represents a halogen atom in formula (VI), the halogen atom is preferably chlorine.

Among the hydrocarbon chains represented by the symbols $Rc^2$ in formula (VI), mention may be made of alkyls, preferably alkyls containing not more than 6 carbon atoms, more preferentially methyl or ethyl, better still methyl.

Among the hydrocarbon chains substituted with a chemical function $Fc^2$ which are represented by the symbols $Rc^2$ in formula (VI), mention may be made of alkanediyl chains, preferably those including not more than 6 carbon atoms, more preferentially the 1,3-propanediyl group, the alkanediyl group bearing a substituent, the chemical function $Fc^2$, in other words one valency of the alkanediyl chain for the function $Fc^2$, the other valency for the silicon atom of the methoxysilane function.

In formula (VI), the term "chemical function" means a group which is different from a saturated hydrocarbon group and which can participate in chemical reactions. A person skilled in the art understands that the chemical function $Fc^2$ in formula (VI) is a group that is chemically inert with respect to the chemical species present in the polymerization medium. The chemical function $Fc^2$ in formula (VI) may be in a protected form, for instance in the case of the primary amine, secondary amine or thiol function. Chemical functions $Fc^2$ that may be mentioned include ether, thioether, protected primary amine, protected secondary amine, tertiary amine, protected thiol and silyl functions. Preferably, the chemical function $Fc^2$ in formula (VI) is a protected primary amine function, a protected secondary amine function, a tertiary amine function or a protected thiol function. As protecting groups for the primary amine, secondary amine and thiol functions, mention may be made of silyl groups, for example the trimethylsilyl and tert-butyldimethylsilyl groups.

As functionalizing agents for preparing a polymer bearing a silanol or alkoxysilane function according to the second variant, mention may be made of the compounds dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine and 3,3-dimethoxy-8,8,9,9-tetramethyl-2-oxa-7-thia-3,8-disiladecane, preferably dimethoxydimethylsilane, dimethoxydiethylsilane, (N,N-dimethyl-3-aminopropyl)methyldimethoxysilane, (N,N-dimethyl-3-aminopropyl)ethyldimethoxysilane, 3-methoxy-3,8,8,9,9-pentamethyl-2-oxa-7-thia-3,8-disiladecane, trimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl)trimethoxysilane, (N-(3-trimethoxysilyl)propyl)-N-(trimethylsilyl)silanamine and 3,3-dinnethoxy-8,8,9,9-tetramethyl-2-oxa-7-thia-3,8-disiladecane.

Whether it is the first or the second variant, the functionalizing agent is typically added to the polymerization medium. It is typically added to the polymerization medium at a degree of conversion of the monomers chosen by a person skilled in the art depending on the desired macrostructure of the polymer. As the polymerization step is generally performed under ethylene pressure, degassing of the polymerization reactor may be performed before the addition of the functionalizing agent. The functionalizing agent is added under inert and anhydrous conditions to the polymerization medium, maintained at the polymerization temperature. Use is typically made of from 0.25 to 10 mol of functionalizing agent per 1 mol of co-catalyst, preferably of from 2 to 4 mol of functionalizing agent per 1 mol of co-catalyst. The functionalizing agent is placed in contact with the polymerization medium for a time that is sufficient to allow the functionalization reaction. This contact time is judiciously chosen by a person skilled in the art as a function of the concentration of the reaction medium and of the temperature of the reaction medium. Typically, the functionalization reaction is performed with stirring, at a temperature ranging from 17° C. to 80° C., for 0.01 to 24 hours.

When the functionalizing agent bears a protected function as described previously, the step of functionalization of the polymer can be followed by a hydrolysis reaction to form a polymer bearing a deprotected function, such as a primary amine, a secondary amine or a thiol function.

A hydrolysis reaction can also follow the reaction for functionalization of the polymer when the functionalization reaction leads to the formation of a polymer bearing an alkoxysilane function. The hydrolysis of the polymer bearing an alkoxysilane function leads to the preparation of a polymer bearing a silanol function.

When the process comprises a functionalization step, the functionalizing agent is preferentially an alkoxysilane, which may bear another function, such as an amine function.

In summary, the invention is advantageously performed according to any one of the following embodiments 1 to 38:

Embodiment 1: Catalytic system based at least:
on a metallocene of formula (Ia) or (Ib),
on a diorganomagnesium compound as co-catalyst, $$\{P(Cp^1)(Cp^2)Y\} \quad (Ia)$$

$$Cp^3Cp^4Y \quad (Ib)$$

Y denoting a group including a metal atom which is a rare-earth metal, $Cp^1$, $Cp^2$, $Cp^3$ and $CP^4$, which may be identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the diorganomagnesium compound being an asymmetric compound of formula (II)

$$R^B\text{—}Mg\text{—}R^A \quad (II)$$

$R^B$ being different from $R^A$, $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being an alkyl, a cycloalkyl or a benzyl, which may be substituted or unsubstituted.

Embodiment 2: Catalytic system according to embodiment 1, in which the metallocene is of formula (Ia).

Embodiment 3: Catalytic system according to either of embodiments 1 and 2, in which $Cp^1$ and $Cp^2$ are identical and are chosen from the group consisting of substituted fluorenyl groups and the unsubstituted fluorenyl group of formula $C_{13}H_8$.

Embodiment 4: Catalytic system according to any one of embodiments 1 to 3, in which $Cp^1$ and $Cp^2$ each represent an unsubstituted fluorenyl group of formula $C_{13}H_8$.

Embodiment 5: Catalytic system according to any one of embodiments 1 to 4, in which the symbol Y represents the group Met-G, with Met denoting a metal atom which is a rare-earth metal and G denoting a group comprising the borohydride $BH_4$ unit or denoting a halogen atom chosen from the group consisting of chlorine, fluorine, bromine and iodine.

Embodiment 6: Catalytic system according to embodiment 5, in which G denotes a chlorine atom or the group of formula (III)

$$(BH_4)_{(1+y)}\text{-}L_y\text{-}N_x \quad (III)$$

in which

L represents an alkali metal chosen from the group consisting of lithium, sodium and potassium, N represents a molecule of an ether, preferably diethyl ether or tetrahydrofuran, x, which may or may not be an integer, is greater than or equal to 0, y, which is an integer, is greater than or equal to 0.

Embodiment 7: Catalytic system according to embodiment 6, in which G denotes the group of formula (III).

Embodiment 8: Catalytic system according to any one of embodiments 1 to 7, in which the rare-earth metal is a lanthanide, the atomic number of which ranges from 57 to 71.

Embodiment 9: Catalytic system according to any one of embodiments 1 to 8, in which the rare-earth metal is neodymium.

Embodiment 10: Catalytic system according to any one of embodiments 1 to 9, in which the bridge P corresponds to the formula $ZR^1R^2$, Z representing a silicon or carbon atom, $R^1$ and $R^2$, which may be identical or different, each representing an alkyl group comprising from 1 to 20 carbon atoms.

Embodiment 11: Catalytic system according to any one of embodiments 1 to 10, in which the bridge P corresponds to the formula $ZR^1R^2$, Z representing a silicon or carbon atom, $R^1$ and $R^2$, which may be identical or different, each representing a methyl.

Embodiment 12: Catalytic system according to any one of embodiments 9 to 11, in which Z represents a silicon atom.

Embodiment 13: Catalytic system according to any one of embodiments 1 to 12, in which the metallocene is of formula (III-1), (III-2), (III-3), (III-4) or (III-5):

$[Me_2Si(Flu)_2Nd(\mu\text{-}BH_4)_2Li(THF)]$ (III-1)

$[\{Me_2Si(Flu_2Nd(\mu\text{-}BH_4)_2)Li(THF)\}_2]$ (III-2)

$[Me_2SiFlu_2Nd(\mu\text{-}BH_4)(THF)]$ (III-3)

$[\{Me_2SiFlu_2Nd(\mu\text{-}BH_4)(THF)\}_2]$ (III-4)

$[Me_2SiFlu_2Nd(\mu\text{-}BH_4)]$ (III-5)

Flu representing the $C_{13}H_8$ group.

Embodiment 14: Catalytic system according to any one of embodiments 1 to 13, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

Embodiment 15: Catalytic system according to any one of embodiments 1 to 14, in which the carbon atoms of the benzene nucleus of $R^B$ ortho to the magnesium are substituted with a methyl or an ethyl.

Embodiment 16: Catalytic system according to any one of embodiments 1 to 15, in which the carbon atoms of the benzene nucleus of $R^B$ ortho to the magnesium are substituted with a methyl.

Embodiment 17: Catalytic system according to any one of embodiments 1 to 16, in which the diorganomagnesium compound is of formula (IV)

(IV)

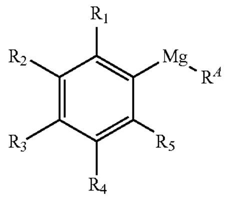

$R_1$ and $R_5$, which may be identical or different, represent a methyl or an ethyl, preferably a methyl, $R_2$, $R_3$ and $R_4$, which may be identical or different, being a hydrogen atom or an alkyl, $R^A$ being an alkyl, a cycloalkyl or a benzyl, which may be substituted or unsubstituted.

Embodiment 18: Catalytic system according to embodiment 17 in which $R_1$ and $R_5$ represent a methyl.

Embodiment 19: Catalytic system according to either of embodiments 17 and 18, in which $R_2$ and $R_4$ represent a hydrogen atom.

Embodiment 20: Catalytic system according to any one of embodiments 17 to 19, in which $R_3$ is identical to $R_1$ and to $R_5$.

Embodiment 21: Catalytic system according to any one of embodiments 1 to 20, in which $R^A$ represents an alkyl containing 1 to 12 carbon atoms.

Embodiment 22: Catalytic system according to any one of embodiments 1 to 21, in which $R^A$ represents an alkyl containing from 2 to 10 carbon atoms.

Embodiment 23: Catalytic system according to any one of embodiments 1 to 22, in which $R^A$ represents an alkyl containing from 2 to 8 carbon atoms.

Embodiment 24: Catalytic system according to any one of embodiments 1 to 23, in which $R^A$ represents a linear alkyl.

Embodiment 25: Catalytic system according to any one of embodiments 1 to 24, in which $R^A$ represents an n-butyl.

Embodiment 26: Catalytic system according to any one of embodiments 1 to 25, in which the ratio between the number of moles of Mg of the co-catalyst and the number of moles of rare-earth metal of the metallocene ranges from 1 to 100.

Embodiment 27: Catalytic system according to any one of embodiments 1 to 26, in which the ratio between the number of moles of Mg of the co-catalyst and the number of moles of rare-earth metal of the metallocene ranges from 1 to less than 10.

Embodiment 28: Catalytic system according to any one of embodiments 1 to 27, which catalytic system comprises a hydrocarbon solvent.

Embodiment 29: Catalytic system according to any one of embodiments 1 to 28, which catalytic system is in solution in a hydrocarbon solvent.

Embodiment 30: Catalytic system according to either of embodiments 28 and 29, in which the hydrocarbon solvent is aromatic or aliphatic.

Embodiment 31: Catalytic system according to any one of embodiments 28 to 30, in which the hydrocarbon solvent is aliphatic.

Embodiment 32: Catalytic system according to any one of embodiments 28 to 31, in which the hydrocarbon solvent is methylcyclohexane.

Embodiment 33: Catalytic system according to any one of embodiments 28 to 32, in which the molar concentration of metal of the metallocene in the catalytic system has a value ranging from 0.0001 to 0.2 mol/l.

Embodiment 34: Catalytic system according to any one of embodiments 28 to 33, in which the molar concentration of metal of the metallocene in the catalytic system has a value ranging from 0.001 to 0.03 mol/l.

Embodiment 35: Process for preparing a polymer, which comprises a step of polymerization of a monomer M chosen from the group of monomers consisting of conjugated dienes, ethylene, α-monoolefins and mixtures thereof in the presence of a catalytic system defined in any one of embodiments 1 to 34.

Embodiment 36: Process according to embodiment 35, in which the monomer M is a mixture of a 1,3-diene and of ethylene, the 1,3-diene preferably being 1,3-butadiene, isoprene, myrcene, β-farnesene or mixtures thereof.

Embodiment 37: Process according to either of the embodiments 35 and 36, which process comprises, after the polymerization step, the addition of a functionalizing agent to functionalize the polymer.

Embodiment 38: Process according to embodiment 37, in which the functionalizing agent is an alkoxysilane.

The abovementioned characteristics of the present invention, and also others, will be understood more clearly on reading the following description of several implementation examples of the invention, which are given as non-limiting illustrations.

Implementation Examples of the Invention

Starting Materials:

Phenylmagnesium bromide dissolved in diethyl ether at 3 mol/L, mesitylmagnesium bromide dissolved in diethyl ether at 1 mol/L, and triisopropylphenylmagnesium bromide dissolved in tetrahydrofuran at 0.5 mol/L are obtained from Sigma-Aldrich and used without prior purification.

Synthesis of the Diorganomagnesium Compounds:

Characterization of the Diorganomagnesium Compounds Synthesized:

The structure of the diorganomagnesium compounds is characterized by 1D $^{1}H$, $^{1}H$-$^{13}C$ HSQC ((Heteronuclear Single Quantum Coherence), 1H-$^{13}C$ HMBC (Heteronuclear Multiple-Bond Correlation) nuclear magnetic resonance NMR. The diorganomagnesium compound is analysed with its synthesis solvent and $d_4$-THF is added to the solution to obtain the NMR "lock".

Procedure for the Syntheses of the Diorganomagnesium Compounds:

Synthesis of Butylphenylmagnesium (PhMgBu): Example not in Accordance with the Invention 1.2 mL of phenyl-Mg—Br at 3 mol/L in diethyl ether are introduced into a pre-sparged Steinie bottle. 57 mL of n-BuLi at 0.06 mol/L in methylcyclohexane (MCH) are then added at 23° C. A white precipitate forms and the bottle is left stirring overnight at 23° C. on a device which shakes the bottle, known as a shaker. The precipitate is filtered off on a 0.45 μm filter during the transfer of the liquid phase to another pre-sparged Steinie bottle. The formation and structure of the symmetrical diorganomagnesium compound are confirmed by the NMR analyses, notably by a chemical shift signal of from 6.55 to 6.6 ppm (benzene nucleus proton) and a chemical shift signal of from −1 to −0.45 ppm (butyl protons).

Synthesis of Butylmesitylmagnesium (MesMgBu):

3.6 mL of mesityl-Mg—Br at 1 mol/L in diethyl ether are introduced into a pre-sparged Steinie bottle. 57 mL of n-BuLi at 0.06 mol/L in MCH are then added at 23° C. A white precipitate forms and the bottle is left stirring overnight at 23° C. on a shaker. The precipitate is filtered off on a 0.45 μm filter during the transfer of the liquid phase to another pre-sparged Steinie bottle. The formation and structure of the symmetrical diorganomagnesium compound are confirmed by the NMR analyses, notably by a chemical shift signal at 6.5 ppm (benzene nucleus proton meta to the magnesium) and a chemical shift signal at −0.5 ppm (proton alpha to the Mg on the n-butyl chain).

Synthesis of Butyltriisopropylphenylmagnesium ((iPr)$_3$PhMgBu):

3 mL of triisopropylphenyl-Mg—Br at 0.5 mol/L in tetrahydrofuran (THF) are introduced into a pre-sparged Steinie bottle. 25 mL of n-BuLi at 0.06 mol/L in MCH are then added. A slight white precipitate forms and the bottle is left overnight at room temperature on a shaker.

The compound is used directly in polymerization.

Copolymerization of Ethylene and of 1,3-butadiene:

The metallocene $[\{Me_2SiFlu_2Nd(\mu\text{-}BH_4)_2Li(THF)\}]_2$ is prepared according to the procedure described in patent application WO 2007/054224.

The butyloctylmagnesium BOMAG (20% in heptane, at 0.88 mol·l$^{-1}$) is obtained from Chemtura and is stored in a Schlenk tube under an inert atmosphere.

The ethylene, of N35 grade, is obtained from the company Air Liquide and is used without prior purification.

The 1,3-butadiene is purified over alumina guards.

The (N,N-dimethyl-3-aminopropyl)methyldimethoxysilane is obtained from ABCR and is used after degassing.

The methylcyclohexane (MCH) solvent obtained from BioSolve is dried and purified on an alumina column in a solvent purifier obtained from mBraun and used under an inert atmosphere.

All the reactions are performed under an inert atmosphere.

The catalytic systems are prepared according to the process disclosed in patent application WO 2007/054224 and described below. All the polymerizations and the functionalization reactions of copolymers of ethylene and of 1,3-butadiene are performed in a reactor having a disposable 500 ml glass tank (Schott flasks) equipped with a stainless-steel stirring blade. The control of the temperature is ensured by means of a thermostatically-controlled oil bath connected to a polycarbonate jacket. This reactor has all the inlets or outlets necessary for the handling operations.

The co-catalyst and then the metallocene are added to a 500-ml glass reactor containing MCH. The amount of co-catalyst introduced is 40 mg, and the ratio between the number of moles of Mg of the co-catalyst and the number of moles of Nd of the metallocene is 4.5. The activation time is 10 minutes and the reaction temperature is 20° C.

The polymerization is performed at 80° C. and at an initial pressure of 4 bar absolute in the 500 mL glass reactor containing 300 mL of polymerization solvent, methylcyclohexane, and the catalytic system. The 1,3-butadiene and ethylene are introduced in the form of a gaseous mixture containing 20 mol % of 1,3-butadiene. The polymerization reaction is stopped by cooling and degassing the reactor. The copolymer is recovered by precipitation from methanol and then dried. The weighed mass makes it possible to determine the mean catalytic activity of the catalytic system, expressed in kilograms of copolymer synthesized per mole of neodymium metal and per hour (kg/mol·h).

Unless otherwise indicated, the polymerization is stopped by degassing the reactor and adding the functionalizing agent at 80° C. after formation of 12 to 13 g of polymer. The co-catalysts used are butyloctylmagnesium (BOMAG), phenyl-Mg-butyl, mesityl-Mg-butyl and triisopropylphenyl-Mg-butyl. For each of the co-catalysts, the catalytic activity of the catalytic system is determined. The results are given in Table 1. The polymers synthesized are characterized by proton and carbon-13 NMR and by size exclusion chromatography (SEC). The results are given in Table 2 (microstructure) and Table 3 (macrostructure).

Functionalization Procedure:

When the desired monomer conversion is achieved, the content of the reactor is degassed and two equivalents (relative to the magnesium) of the functionalizing agent, (N,N-dimethyl-3-aminopropyl)methyldimethoxysilane, are then introduced under an inert atmosphere by positive pressure. The reaction medium is stirred for 60 minutes at 80° C. After reaction, the medium is degassed and then precipitated from methanol. The polymers are redissolved in toluene and then precipitated from methanol so as to remove the ungrafted "silane" molecules, which makes it possible to improve the quality of the signals of the spectra for the quantification of the functional group content and the integration of the various signals. The polymer is antioxidized with 0.2 phr of N-(1,3-dimethylbutyl)-N'-phenyl-p-phenylenediamine and 0.6 phr of 2,2'-methylenebis(6-tert-butyl-4-methylphenol) and then dried at 60° C. under vacuum to constant mass. It is then analysed by SEC (THF), and $^{1}H$, $^{13}C$ and $^{29}Si$ NMR. The results are given in Table 4.

Nuclear Magnetic Resonance (NMR):

All the products for functionalization of the copolymers of ethylene and of 1,3-butadiene are characterized by $^{1}H$, $^{13}C$ and $^{29}Si$ NMR spectrometry. The NMR spectra are acquired on a Brüker Avance III 500 MHz spectrometer equipped with a 5 mm BBlz-grad "broad band" cryoprobe. The quantitative $^{1}H$ NMR experiment uses a 30° single pulse sequence and a repetition time of 5 seconds between each acquisition. 64 to 256 accumulations are performed. The quantitative $^{13}C$ NMR experiment uses a 30° single pulse sequence with proton decoupling and a repetition time of 10 seconds between each acquisition. 1024 to 10 240 accumulations are performed. $^{1}H/^{13}C$ and $^{1}H/^{29}Si$ two-dimensional experiments are used for the purpose of determining the structure of the functional polymers. The determination of the microstructure of the copolymers is defined in the literature, according to the article by Llauro et al., *Macromolecules* 2001, 34, 6304-6311.

The final chemical structure of each functional polymer is identified by NMR ($^{1}H$, $^{13}C$ and $^{29}Si$).

Size Exclusion Chromatography (SEC):

a) For the copolymers which are soluble at room temperature in tetrahydrofuran (THF), the molar masses were determined by size exclusion chromatography in THF. The samples were injected using a Waters 717 injector and a Waters 515 HPLC pump at a flow rate of 1 ml·min$^{-1}$ in a series of Polymer Laboratories columns.

This series of columns, placed in a chamber thermostatically maintained at 45° C., is composed of:

1 PL Gel 5 μm precolumn,

2 PL Gel 5 μm Mixed C columns,

1 PL Gel 5 μm-500 Å column.

The detection was performed using a Waters 410 refractometer.

The molar masses were determined by universal calibration using polystyrene standards certified by Polymer Laboratories and a double detection with a refractometer and coupling to the viscometer.

Without being an absolute method, SEC makes it possible to comprehend the molecular mass distribution of a polymer. On the basis of standard commercial products of polystyrene type, the various number-average (Mn) and weight-average (Mw) masses can be determined and the polydispersity index can be calculated (PDI=Mw/Mn).

b) For the copolymers which are insoluble in tetrahydrofuran at room temperature, the molar masses were determined in 1,2,4-trichlorobenzene. They were first dissolved under hot conditions (4 hours at 150° C.) and were then injected at 150° C., at a flow rate of 1 ml·min$^{-1}$, into a Waters Alliance GPCV 2000 chromatograph equipped with three Styragel columns (two HT6E columns and one HT2 column).

The detection was performed using a Waters refractometer.

The molar masses were determined by relative calibration using polystyrene standards certified by Polymer Laboratories.

TABLE 1

| Example | Co-catalyst | Activity (kg/mol · h) |
|---|---|---|
| 1 | BOMAG | 125 |
| 2 | PhMgBu | 71 |
| 3 | MesMgBu | 143 |
| 4 | (iPr)3PhMgBu | 32 |

TABLE 1-continued

TABLE 2

| Co-catalyst | % Eth in EBR (1) | % PB1,2/EBR (2) | % PB1,4/EBR (3) | % cycles/EBR (4) |
|---|---|---|---|---|
| BOMAG | 80 | 4 | 4-5 | 11-12 |
| PhMgBu | 79 | 5 | 4 | 11 |
| MesMgBu | 76-78 | 5-6 | 5 | 11-13 |
| (iPr)3PhMgBu | 77 | 6 | 5 | 11 |

(1) molar content of (CH2—CH2) units in the copolymer
(2) molar content of (CH2—C(CH═CH2)) units in the copolymer
(3) molar content of (CH2—CH═CH—CH2) units in the copolymer
(4) molar content of 1,2-cyclohexanediyl units in the copolymer

TABLE 3

| Example | Co-catalyst | nMg (μmol) (1) | mpolymer (g) (2) | Ip (3) |
|---|---|---|---|---|
| 1 | BOMAG | 278 | 11.5 | 1.40 |
| 2 | PhMgBu | 282 | 13.4 | 1.41 |
| 3 | MesMgBu | 275 | 13.1 | 1.30 |
| 4 | (iPr)3PhMgBu | 293 | 2.2 | 1.51 |

(1) number of moles of magnesium introduced into the reactor
(2) mass of copolymer formed
(3) polydispersity index of the copolymer

TABLE 4

| Example | Co-catalyst | Functional group content |
|---|---|---|
| 1 | BOMAG | 45% |
| 2 | PhMgBu | 46% |
| 3 | MesMgBu | 57% |
| 4 | (iPr)3PhMgBu | 60% |

The results given in Table 4 show that the catalytic systems according to the invention (Examples 3 and 4), which differ from those of the prior art by the presence in the co-catalyst of a disubstituted benzene nucleus ortho to the magnesium, make it possible to improve the content of functional polymer chains in the reaction for the functionalization of the copolymer of ethylene and of 1,3-diene. An 11% gain in the functionalization reaction yield is obtained. These results are obtained even though the microstructure and the macrostructure (PDI) of the polymers synthesized in Examples 1 to 4 are virtually identical (Tables 2 and 3).

An improvement in the process for synthesizing the polymers may also be observed, when the substituents on the benzene nucleus ortho to the magnesium in the asymmetric diorganomagnesium compound are both other than an isopropyl group (Table 1). Specifically, the catalytic activity in Example 3 is the highest: a gain of at least 10% is obtained relative to the other examples.

In summary, the combined use of the metallocene and of the asymmetric diorganomagnesium compound as described according to the embodiments of the invention makes it possible to increase the content of functional polymer chains. Even the catalytic activity in the synthesis of polymers may also be improved when the substituents on the benzene nucleus ortho to the magnesium in the asymmetric diorganomagnesium compound are both other than an isopropyl group.

The invention claimed is:

1. A catalytic system based at least:

on a metallocene of formula (Ia) or (Ib), on a diorganomagnesium compound as co-catalyst, $$\{P(Cp^1)(Cp^2)Y\} \quad \text{(Ia)}$$

$$Cp^3Cp^4Y \quad \text{(Ib)}$$

Y denoting a group including a metal atom which is a rare-earth metal, $Cp^1$, $Cp^2$, $Cp^3$ and $Cp^4$, which may be identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the diorganomagnesium compound being an asymmetric compound of formula (II)

$$R^B—Mg—R^A \quad \text{(II)}$$

$R^B$ being different from $R^A$, $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbor and which is meta to the magnesium, the other carbon atom of the benzene nucleus ortho to the magnesium being substituted with a methyl, an ethyl or an isopropyl, and $R^A$ being an alkyl, a cycloalkyl or a benzyl, which may be substituted or unsubstituted.

2. The catalytic system according to claim 1, in which $Cp^1$ and $Cp^2$ are identical and are chosen from the group consisting of substituted fluorenyl groups and the unsubstituted fluorenyl group of formula $C_{13}H_8$.

3. The catalytic system according to claim 2, in which $Cp^1$ and $Cp^2$ each represent an unsubstituted fluorenyl group of formula $C_{13}H_8$.

4. The catalytic system according to claim 1, in which the symbol Y represents the group Met-G, with Met denoting a metal atom which is a rare-earth metal and G denoting a group comprising the borohydride $BH_4$ unit or denoting a halogen atom chosen from the group consisting of chlorine, fluorine, bromine and iodine.

5. The catalytic system according to claim 4, in which G denotes a chlorine atom or the group of formula (III)

$$(BH_4)_{(1+y)}\text{-}L_y\text{-}N_x \quad \text{(III)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

6. The catalytic system according to claim 5, in which N represents diethyl ether or tetrahydrofuran.

7. The catalytic system according to claim 1, in which the rare-earth metal is a lanthanide, the atomic number of which ranges from 57 to 71.

8. The catalytic system according to claim 7, in which the rare-earth metal is neodymium.

9. The catalytic system according to claim 1, in which the bridge P corresponds to the formula $ZR^1R^2$, Z representing a silicon or carbon atom and $R^1$ and $R^2$, which may be identical or different, each representing an alkyl group comprising from 1 to 20 carbon atoms.

10. The catalytic system according to claim 9, in which $R^1$ and $R^2$ each represent methyl.

11. The catalytic system according to claim 1, in which the metallocene is of formula (III-1), (III-2), (III-3), (III-4) or (III-5):

$$[Me_2Si(Flu)_2Nd(\mu\text{-}BH_4)_2Li(THF)] \quad \text{(III-1)},$$

$$[\{Me_2SiFlu_2Nd(\mu\text{-}BH_4)_2)Li(THF)\}_2] \quad \text{(III-2)},$$

$$[Me_2SiFlu_2Nd(\mu\text{-}BH_4)(THF)] \quad \text{(III-3)},$$

$$[\{Me_2SiFlu_2Nd(\mu\text{-}BH_4)(THF)\}_2] \quad \text{(III-4)},$$

$$[Me_2SiFlu_2Nd(\mu\text{-}BH_4)] \quad \text{(III-5)},$$

Flu representing the $C_{13}H_8$ group.

12. The catalytic system according to claim 1, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

13. The catalytic system according to claim 1, in which the carbon atoms of the benzene nucleus of $R^B$ ortho to the magnesium are substituted with a methyl or an ethyl.

14. The catalytic system according to claim 1, in which the diorganomagnesium compound is of formula (IV)

(IV)

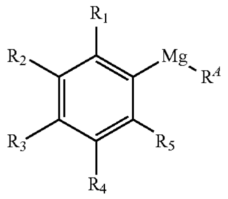

$R_1$ and $R_5$, which may be identical or different, represent a methyl or an ethyl, $R_2$, $R_3$ and $R_4$, which may be identical or different, being a hydrogen atom or an alkyl, $R^A$ being an alkyl, a cycloalkyl or a benzyl, which may be substituted or unsubstituted.

15. The catalytic system according to claim 1, in which $R^A$ represents an alkyl containing from 2 to 10 carbon atoms.

16. The catalytic system according to claim 1, in which the ratio between the number of moles of Mg of the co-catalyst and the number of moles of rare-earth metal of the metallocene ranges from 1 to 100.

17. A process for preparing a polymer, which comprises a step of polymerization of a monomer M chosen from the group of monomers consisting of conjugated dienes, ethylene, α-monoolefins and mixtures thereof in the presence of the catalytic system defined in claim 1.

18. The process according to claim 17, in which the monomer M is a mixture of a 1,3-diene and of ethylene.

19. The process according to claim 18, said process comprising, after the polymerization step, the addition of a functionalizing agent to functionalize the polymer, the functionalizing agent being an alkoxysilane.

20. The process according to claim 18, wherein the 1,3-diene is 1,3-butadiene, isoprene, myrcene, β-farnesene or mixtures thereof.

21. The catalytic system according to claim 1, wherein the metallocene is of formula (Ia).

22. The catalytic system according to claim 1, in which the two carbon atoms of the benzene nucleus of $R^B$ ortho to the magnesium are not substituted with an isopropyl.

* * * * *